United States Patent
Suzuki et al.

(10) Patent No.: US 10,337,805 B2
(45) Date of Patent: Jul. 2, 2019

(54) HEAT STORAGE DEVICE

(71) Applicant: Panasonic Intellectual Property Management Co., Ltd., Osaka-shi, Osaka (JP)

(72) Inventors: Motohiro Suzuki, Osaka (JP); Hironori Tomita, Nara (JP); Yoshiaki Kurosawa, Osaka (JP); Atsunori Hashimoto, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 391 days.

(21) Appl. No.: 14/419,405

(22) PCT Filed: Mar. 27, 2014

(86) PCT No.: PCT/JP2014/001794
§ 371 (c)(1),
(2) Date: Feb. 3, 2015

(87) PCT Pub. No.: WO2014/167798
PCT Pub. Date: Oct. 16, 2014

(65) Prior Publication Data
US 2015/0192370 A1 Jul. 9, 2015

(30) Foreign Application Priority Data
Apr. 10, 2013 (JP) .................. 2013-082421

(51) Int. Cl.
*F28D 17/00* (2006.01)
*F28D 20/00* (2006.01)
(Continued)

(52) U.S. Cl.
CPC .......... *F28D 20/0056* (2013.01); *C09K 5/063* (2013.01); *F28D 20/02* (2013.01);
(Continued)

(58) Field of Classification Search
CPC .... F28D 20/0056; F28D 20/021; F28D 20/00; F28D 2020/0008; F28D 20/02;
(Continued)

(56) References Cited

U.S. PATENT DOCUMENTS 5,222,298 A * 6/1993 Schatz .................. F28D 20/021
165/10
6,343,485 B1 * 2/2002 Duerr ..................... B60H 1/005
62/430
(Continued)

FOREIGN PATENT DOCUMENTS

DE     41 00 193     7/1992
JP     60-030996     2/1985
(Continued)

OTHER PUBLICATIONS

Extended European Search Report issued in corresponding European Application No. 14783004.6, dated Mar. 9, 2016, 6 pages.

*Primary Examiner* — Keith M Raymond
*Assistant Examiner* — Kamran Tavakoldavani
(74) *Attorney, Agent, or Firm* — Hamre, Schumann, Mueller & Larson, P.C.

(57) ABSTRACT

A heat storage device (1) of the present disclosure includes: a heat storage container (10) having an inlet (2) and an outlet (3) for a heat medium; a plate-like heat storage body (4) disposed in the heat storage container (10) and having a heat storage material (4*a*) and an envelope (4*b*) containing the heat storage material (4*a*); a plate-like spacer (6) placed on the heat storage body (4) in the heat storage container (10) and having a plurality of contact portions (6*a*) that are in contact with the heat storage body (4) and a plurality of non-contact portions (6*b*) that are spaced from the heat storage body (4), the contact portions (6*a*) and the non-contact portions (6*b*) being alternately formed in a specific direction; and a plurality of flow paths (5) for leading the (Continued)

heat medium from the inlet (2) to the outlet (3), the flow paths being formed by a surface of the heat storage body (4) and the non-contact portions (6b) and extending in a direction intersecting the specific direction. Thereby, the heat transfer characteristics between the heat storage material and the heat medium are good.

14 Claims, 11 Drawing Sheets

(51) Int. Cl.
*F28D 20/02* (2006.01)
*C09K 5/06* (2006.01)

(52) U.S. Cl.
CPC .... *F28D 20/021* (2013.01); *F28D 2020/0021* (2013.01); *F28F 2240/00* (2013.01); *F28F 2265/14* (2013.01); *Y02E 60/145* (2013.01)

(58) Field of Classification Search
CPC ..... F28D 2020/0013; F28D 2020/0021; F28D 20/023; F28D 2020/0069; F28D 2020/0086; F28D 2020/0091; F28D 2020/0095; F28F 2240/00; F28F 2265/14
See application file for complete search history.

(56) References Cited

U.S. PATENT DOCUMENTS

| | | | | |
|---|---|---|---|---|
| 8,618,205 | B2 * | 12/2013 | Shimakage | ........... C08L 53/025 |
| | | | | 524/487 |
| 9,151,545 | B2 * | 10/2015 | Soukhojak | ............... C09K 5/04 |
| 2007/0068661 | A1 * | 3/2007 | Yabe | ..................... F28D 1/0391 |
| | | | | 165/152 |
| 2011/0016858 | A1 | 1/2011 | Gaiser | |
| 2011/0179807 | A1 * | 7/2011 | Holloway | ............. F24F 5/0017 |
| | | | | 62/3.62 |
| 2012/0048768 | A1 | 3/2012 | Holloway et al. | |
| 2012/0263980 | A1 | 10/2012 | Soukhojak et al. | |

FOREIGN PATENT DOCUMENTS

| | | | | |
|---|---|---|---|---|
| JP | 6-341780 | | 12/1994 | |
| JP | 2000-018864 | | 1/2000 | |
| JP | 2000-283506 | | 10/2000 | |
| JP | 2005-172342 | | 6/2005 | |
| JP | 2007-322102 | | 12/2007 | |
| JP | 2010071633 A | * | 4/2010 | |
| JP | WO 2011078340 A1 | * | 6/2011 | ........... C08L 53/025 |
| JP | 2011-174684 | | 9/2011 | |
| JP | 4816537 B | | 11/2011 | |
| WO | 2009/105643 | | 8/2009 | |
| WO | WO 2010071633 A1 | * | 6/2010 | ........... C30B 25/04 |
| WO | 2011/078340 | | 6/2011 | |

\* cited by examiner

HEAT STORAGE DEVICE

TECHNICAL FIELD

The present invention relates to a heat storage device.

BACKGROUND ART

Heat storage materials are made of materials containing large heat capacity substances. Heat stored in such a substance in a heat storage material can be removed from the heat storage material, as needed. Conventionally, water is commonly used as a heat storage material. In most cases, however, the form of heat storage using water as a heat storage material depends on the use of sensible heat resulting from a change in the temperature of water. Therefore, in order to further increase the amount of stored heat, the use of a heat storage material that can store latent heat associated with its phase change has attracted attention as another form of heat storage.

Known heat storage materials that can store latent heat include hydrate, water (ice), and paraffin. These heat storage materials are fluidized as their phase changes. Therefore, in order to prevent the fluidized heat storage materials from drifting with heat media and leaking, they are usually placed in containers when they are used.

As shown in FIG. 11, Patent Literature 1 discloses a heat storage device 100 in which a hydrate is used as a heat storage material. The heat storage device 100 includes heat storage means 104, heat transfer walls 105, and fluid passages 106. The heat storage means 104 each have a latent heat storage agent 103 formed in a flat plate shape and an aluminum-laminated film bag 102 in which the latent heat storage agent 103 is vacuum-sealed. The heat transfer walls 105 hold the heat storage means 104 therebetween. Each of the heat transfer walls 105 is formed of two regularly corrugated copper plates that are joined together. The fluid passages 106 are formed between the two copper plates. The heat storage means 104 is heated or cooled by a heat medium (for example, water) flowing in the fluid passages 106. As the latent heat storage agent 103, sodium acetate trihydrate is used.

Patent Literature 2 discloses a heat storage material containing a paraffin compound. This heat storage material contains the paraffin compound and a hydrogenated diene copolymer having a function of fixing the paraffin compound. Thereby, this heat storage material has properties such that it is free from phase separation or liquid phase bleeding even at or above the maximum crystal transition temperature Tmax of the paraffin compound as a component of the material and that it has excellent shape stability and excellent fluidity during forming.

CITATION LIST

Patent Literature

Patent Literature 1: JP 4816537 B2
Patent Literature 2: WO 2011/078340 A1

SUMMARY OF INVENTION

Technical Problem

The heat storage device described in Patent Literature 1 has room for further improvement in the performance in terms of the heat transfer characteristics between the heat storage material and the heat medium. Therefore, it is an object of the present invention to provide a heat storage device having good heat transfer characteristics between a heat storage material and a heat medium.

Solution to Problem

The present disclosure provides a heat storage device including: a heat storage container having an inlet and an outlet for a heat medium; a plate-like heat storage body disposed in the heat storage container, the heat storage body including a heat storage material and an envelope containing the heat storage material; a plate-like spacer placed on the heat storage body in the heat storage container, the spacer having a plurality of contact portions that are in contact with the heat storage body and a plurality of non-contact portions that are spaced from the heat storage body, and the contact portions and the non-contact portions being alternately formed in a specific direction; and a plurality of flow paths for leading the heat medium from the inlet to the outlet, the flow paths being formed by a surface of the heat storage body and the non-contact portions and extending in a direction intersecting the specific direction.

Advantageous Effects of Invention

In the above-described heat storage device, the heat transfer characteristics between the heat storage body (heat storage material) and the heat medium are good.

DESCRIPTION OF EMBODIMENTS

Figure 1:
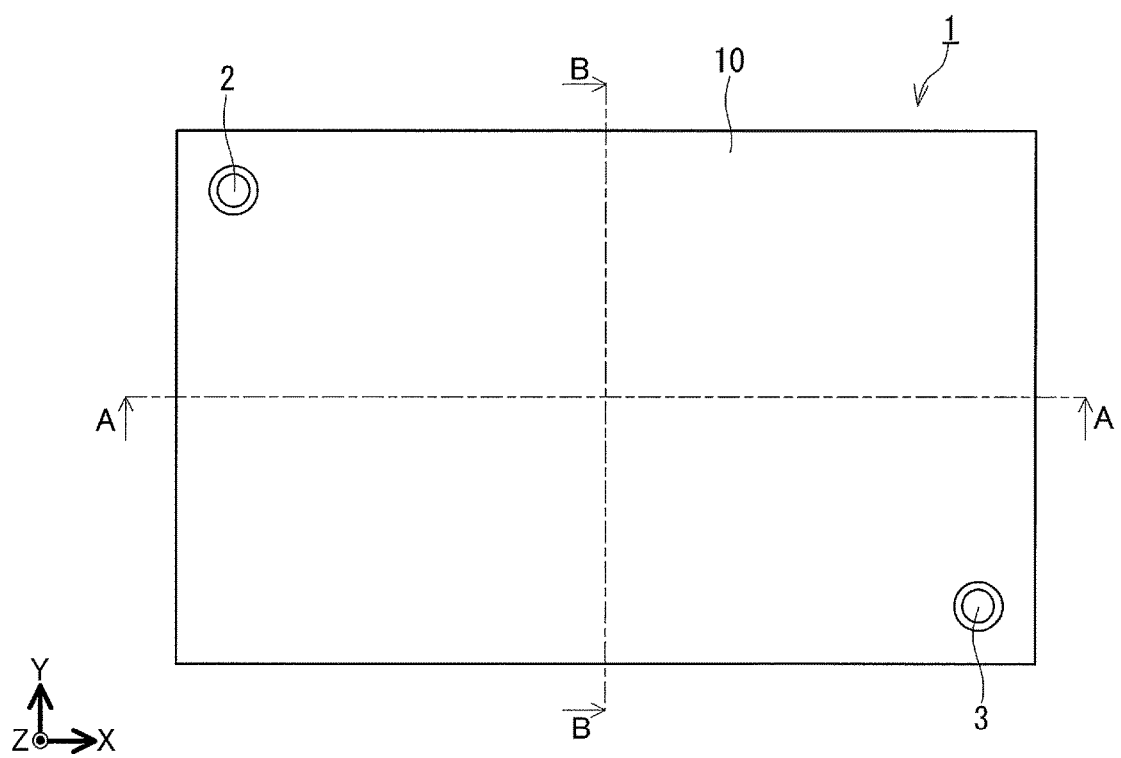
FIG. 1 is a plan view of a heat storage device according to a first embodiment of the present disclosure.

According to the heat storage device 100 of Patent Literature 1, the heat of the heat medium flowing in the fluid passages 106 inside the heat transfer wall 5 is transferred to the heat storage means 104 by contact between the heat transfer wall 105 and the heat storage means 104. It is difficult to bring the heat transfer wall 105 and the aluminum-laminated film bag 102 into complete contact with each other, and thermal contact resistance occurs between the heat transfer wall 105 and the heat storage means 104. Thus, the overall coefficient of heat transfer between the heat medium and the heat storage means 104 is small. Therefore, the heat transfer characteristics between the heat medium and the heat storage means 104 are not very good.

In addition, since the latent heat storage agent 103 is sodium acetate trihydrate, it changes from a solid phase to a liquid phase and exhibits fluidity as the temperature rises. Therefore, since the shape of the latent heat storage agent 103 is not stable in the solidification and melting cycle of the latent heat storage agent 103, the reliability of the heat storage device 100 decreases.

The heat storage material described in Patent Literature 2 is in a gel state at or above Tmax of the paraffin compound contained therein, although it does not exhibit fluidity at that temperature. When this heat storage material is placed in a heat storage container, the shape of the heat storage material may become unstable.

A first aspect of the present disclosure provides a heat storage device including: a heat storage container having an inlet and an outlet for a heat medium; a plate-like heat storage body disposed in the heat storage container, the heat storage body including a heat storage material and an envelope containing the heat storage material; a plate-like spacer placed on the heat storage body in the heat storage container, the spacer having a plurality of contact portions that are in contact with the heat storage body and a plurality of non-contact portions that are spaced from the heat storage body, and the contact portions and the non-contact portions being alternately formed in a specific direction; and a plurality of flow paths for leading the heat medium from the inlet to the outlet, the flow paths being formed by a surface of the heat storage body and the non-contact portions and extending in a direction intersecting the specific direction.

According to the first aspect, the plurality of flow paths for the heat medium are formed by the surface of the heat storage body and the plurality of non-contact portions. Therefore, the heat medium and the heat storage body are in direct contact with each other and no thermal contact resistance occurs between them. Thus, the heat transfer characteristics between them are good.

A second aspect of the present disclosure provides the heat storage device according to the first aspect, wherein the contact portions each have a curved shape. According to the second aspect, it is possible to reduce stress concentration on the surface of the envelope that is in contact with the contact portions. In addition, a load applied to the heat storage body from the spacer can be distributed. Since the heat storage body is deformed to conform to the shape of the contact portions, the shape of the heat storage body is maintained even if a cycle of heat storage and heat release is repeated. Thus, it is possible to prevent the flow paths from being closed.

A third aspect of the present disclosure provides the heat storage device according to the first aspect or the second aspect, wherein the spacer is a member having a corrugated structure. According to the third aspect, it is possible to easily form the contact portions and the non-contact portions on both surfaces of the spacer having the corrugated structure.

A fourth aspect of the present disclosure provides the heat storage device according to any one of the first aspect to the third aspect, wherein when a distance in a thickness direction of the spacer between a point of contact of the contact portion with the heat storage body and a point of the non-contact portion farthest from the heat storage body is defined as L and a thickness of the heat storage body is defined as T, L/T is 0.2 or more. According to the fourth aspect, it is possible to limit an increase in the volume of the heat storage body caused by the phase change of the heat storage material, within the spaces between the non-contact portions and the surface of the heat storage body. Thereby, it is possible to prevent the flow paths for the heat medium from being closed by the phase change of the heat storage material.

A fifth aspect of the present disclosure provides the heat storage device according to any one of the first aspect to the fourth aspect, wherein the heat storage body is disposed in the heat storage container in such a manner that a sealing portion of the envelope is located at an upstream end of the envelope in a direction of flow of the heat medium, and the heat storage device further includes a cover located upstream of the sealing portion in the flow of the heat medium, the cover covering the sealing portion. According to the fifth aspect, it is possible to prevent the flexure of the sealing portion from causing an imbalance between the flow rate of the heat medium flowing on the side of one surface of the heat storage body and the flow rate of the heat medium flowing on the side of the other surface of the heat storage body.

A sixth aspect of the present disclosure provides the heat storage device according to any one of the first aspect to the fifth aspect, wherein the heat storage bodies and the spacers are alternately arranged in a vertical direction in the heat storage container, and a specific gravity of the heat storage body is less than that of the heat medium. According to the sixth aspect, when the heat storage container is filled with the heat medium, the buoyancy acting on the heat storage body is greater than the gravity acting on the heat storage body. Therefore, it is possible to prevent the heat storage body located near the bottom of the heat storage container from being subjected to a heavy load.

A seventh aspect of the present disclosure provides the heat storage device according to any one of the first aspect to the sixth aspect, wherein the heat storage bodies and the spacers are alternately arranged in a horizontal direction in the heat storage container. According to the seventh aspect, it is possible to prevent a specific heat storage body from being subjected to a heavy load.

An eighth aspect of the present disclosure provides the heat storage device according to any one of the first aspect to the seventh aspect, wherein the heat storage material stores heat by phase change from a solid state to a gel state. According to the eighth aspect, the shape of the heat storage body is relatively stable even if the phase of the heat storage material changes. Therefore, the flow paths for the heat medium are less likely to be closed by the deformation of the heat storage body associated with the phase change of the heat storage material.

A ninth aspect of the present disclosure provides the heat storage device according to the eighth aspect, wherein the heat storage body has a protruding portion that protrudes toward the non-contact portion when the heat storage material is in the gel state, and a gap serving as the flow path is formed between the protruding portion and the non-contact portion. According to the ninth aspect, it is possible to prevent the flow paths for the heat medium from being closed by the heat storage body when the heat storage material is in the gel state.

A tenth aspect of the present disclosure provides the heat storage device according to the eighth aspect or the ninth aspect, wherein the heat storage material is made of a material containing a paraffin compound and a hydrogenated diene copolymer that fixes the paraffin compound so that the heat storage material changes into the gel state at or above a melting point of the paraffin compound. According to the tenth aspect, it is possible to provide a heat storage device in which the heat storage material changes from the solid state to the gel state at an appropriate temperature suitable for the environment in which the heat storage device is used, by selecting the type of the paraffin compound contained in the heat storage material.

An eleventh aspect of the present disclosure provides the heat storage device according to any one of the first aspect to the tenth aspect, wherein the heat medium is an aqueous solution of ethylene glycol or an aqueous solution of propylene glycol. According to the eleventh aspect, it is possible to prevent freezing of the heat medium.

First Embodiment

Hereinafter, embodiments of the present disclosure will be described with reference to the drawings. It should be noted that the following describes some examples of the present invention, and the present invention is not intended to be limited to these examples.

Figure 2:
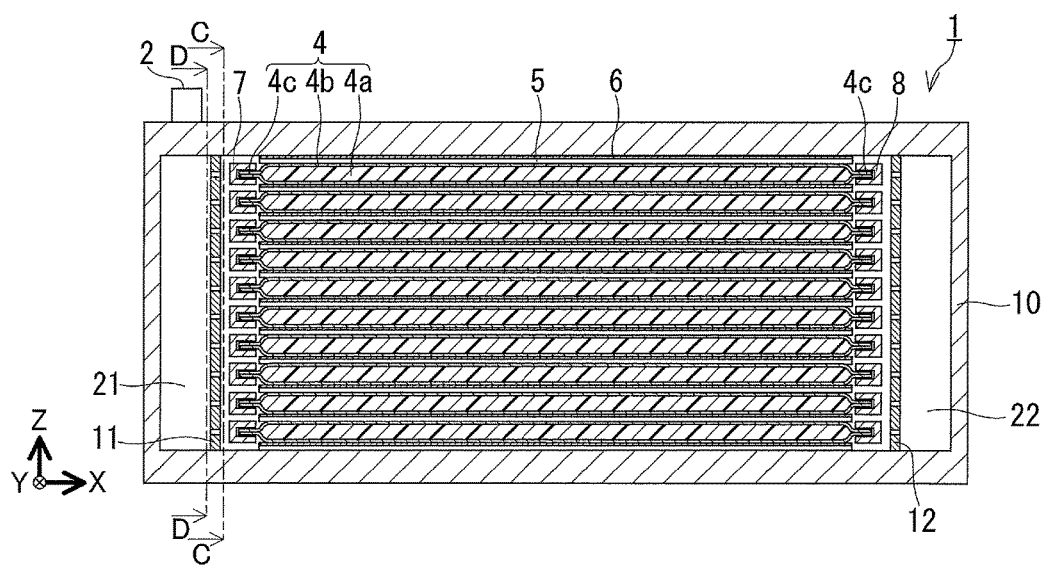
FIG. 2 is a cross-sectional view of the heat storage device shown in FIG. 1, taken along the line A-A.

As shown in FIG. 1 and FIG. 2, a heat storage device 1 includes a heat storage container 10, heat storage bodies 4, spacers 6, upstream-side covers 7, downstream-side covers 8, an upstream-side flow regulation member 11, and a downstream-side flow regulation member 12. The heat storage container 10 is a rectangular parallelepiped container. The heat storage bodies 4, the spacers 6, the upstream-side covers 7, the downstream-side covers 8, the upstream-side flow regulation member 11, and the downstream-side flow regulation member 12 are disposed in the heat storage container 10. As shown in FIG. 2, the spacer 6 is placed on the heat storage body 4 in the heat storage container 10. The direction in which the spacer 6 is placed on the heat storage body 4 is defined as the Z-axis direction. The plane perpendicular to the Z axis is defined as the XY plane. As shown in FIG. 2, the spacer 6 and the heat storage body 4 form flow paths 5 therebetween. The direction in which the flow path 5 extends is defined as the X-axis direction. The Y axis is perpendicular to the X axis.

As shown in FIG. 1, the heat storage container 10 has an inlet 2 for a heat medium and an outlet 3 for the heat medium. On a specific surface of the heat storage container 10, the inlet 2 is provided at one end portion in the longitudinal direction (X-axis direction) of the heat storage container 10. On the specific surface of the heat storage container 10, the outlet 3 is provided at the other end portion in the longitudinal direction (X-axis direction) of the heat storage container 10. In addition, on the specific surface of the heat storage container 10, the inlet 2 is provided close to one end in the width direction (Y-axis direction) of the heat storage container 10. In addition, on the specific surface of the heat storage container 10, the outlet 3 is provided close to the other end in the width direction thereof. The inlet 2 and the outlet 3 are provided near a pair of diagonal corners of the specific surface of the heat storage container 10.

Figure 9:
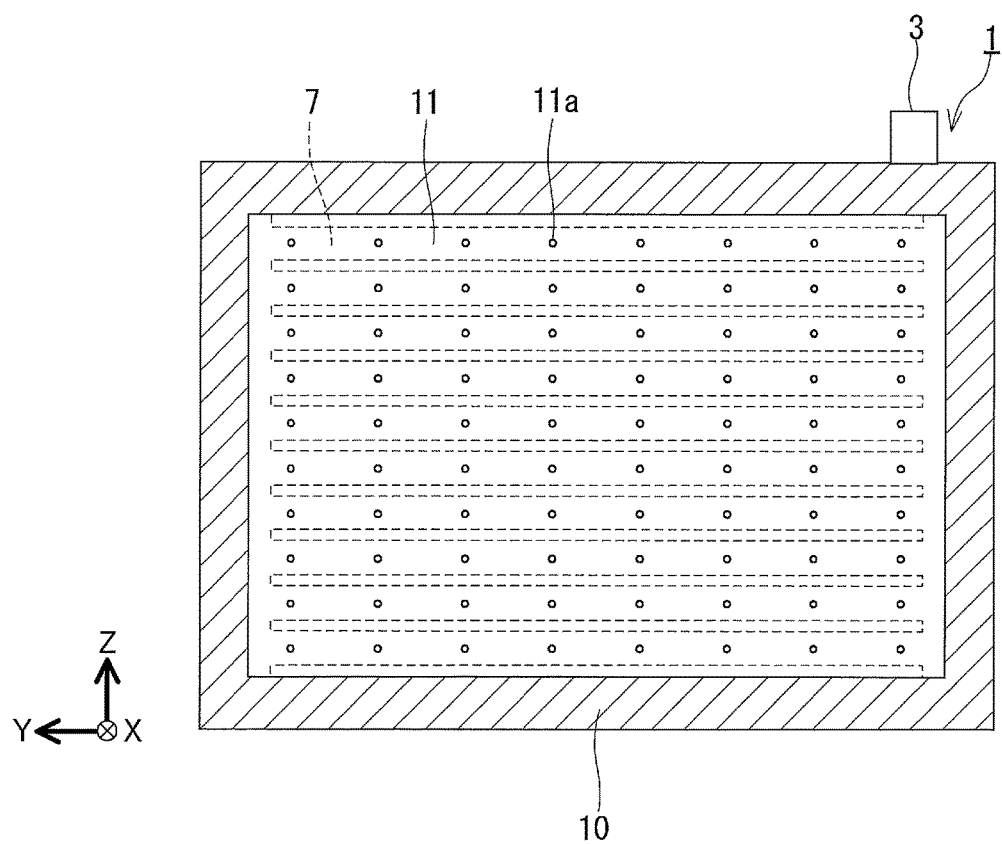
FIG. 9 is a cross-sectional view of the heat storage device shown in FIG. 2, taken along the line D-D.

The heat medium flows into the heat storage container 10 through the inlet 2. The heat medium that has flowed into the heat storage container 10 flows in the longitudinal direction of the heat storage container 10 (positive X-axis direction) toward the outlet 3 in the interior space of the heat storage container 10. As shown in FIG. 2, the upstream-side flow regulation member 11 is a plate-like member that partitions the interior space of the heat storage container 10 at a position downstream of the inlet 2 (on the side of the positive X-axis direction). Thus, an upstream-side flow regulation space 21 is formed upstream of the upstream-side flow regulation member 11. As shown in FIG. 9, many through holes 11a are formed in the upstream-side flow regulation member 11. The heat medium that has flowed in the device through the inlet 2 is temporarily retained in the upstream-side flow regulation space 21, and then passes through the through holes 11 and flows downstream of the upstream-side flow regulation member 11. The upstream-side flow regulation member 11 regulates the flow of the heat medium so that the heat medium flows at an almost uniform rate in the longitudinal direction of the heat storage container 10 (positive X-axis direction).

The downstream-side flow regulation member 12 is a plate-like member that partitions the interior space of the heat storage container 10 at a position upstream of the outlet 3 (on the side of the negative X-axis direction). Thus, a downstream-side flow regulation space 22 is formed downstream of the downstream-side flow regulation member 12. The downstream-side flow regulation member 12 is configured in the same manner as the upstream-side flow regulation member 11 and has many through holes. The heat medium in the downstream-side flow regulation space 22 is discharged outside the heat storage container 10 through the outlet 3.

As shown in FIG. 2, the heat storage bodies 4 and the spacers 6 are arranged in the heat storage container 10. Specifically, the heat storage bodies 4 and the spacers 6 are arranged between the upstream-side flow regulation member 11 and the downstream-side flow regulation member 12 in the interior space of the heat storage container 10. Each of the heat storage bodies 4 has a heat storage material 4a and an envelope 4b (packaging bag) containing the heat storage material 4a. As shown in FIG. 2, the heat storage body 4 has a plate-like shape. The heat storage material 4a has the property of storing heat by its phase change. The heat storage material 4a has, for example, the property of storing heat by its phase change from the solid state to the gel state. The heat storage material 4a is a material containing a heat storage component and a structural component that fixes the heat storage component so that the heat storage material 4a changes into the gel state at or above the melting point of the heat storage component. The structural component is typically a polymer. The structural component can fix the heat storage component at or below the dropping point of the structural component. Therefore, the heat storage material 4a is in the gel state at or above the melting point of the heat storage component and at or below the dropping point of the structural component. Here, the dropping point of the structural component is the value measured according to JIS (Japanese Industrial Standards) K 2220:2003.

The material constituting the heat storage material 4a is, for example, a material containing a paraffin compound (heat storage component) and a hydrogenated diene copolymer (structural component) that fixes the paraffin compound so that the heat storage material 4a changes into the gel state at or above the melting point of the paraffin compound. Such a material is, for example, CALGRIP (registered trademark) manufactured by JSR Corporation. Examples of such a material include the materials described in WO 2011/078340 A1. In this case, as the paraffin compound contained in the heat storage material 4a, a paraffin compound having a melting point suitable for the environment in which the heat storage device 1 is used can be selected.

The heat storage material 4a may be a material containing a latent heat storage agent (heat storage component) consisting of normal paraffin, a fixing agent (structural component) consisting of a fatty acid metal salt such as aluminum 2-ethylhexanoate, and a fixing accelerator such as a higher fatty acid (for example, oleic acid). The heat storage material 4a may be a material containing, as main components, a paraffin (heat storage component) and a thermoplastic elastomer (structural component) containing a thermoplastic component and a rubber component in a molecule. In this description, the "main component" means a component with the highest mass content. Examples of the thermoplastic elastomer include styrene elastomers, olefin elastomers, urethane elastomers, and ester elastomers. Furthermore, the heat storage material 4a may be a material consisting of a solid-state mixture of a heat storage component containing 20 to 150 parts by weight of eicosane per 100 parts by weight of 115° F. paraffin wax and a hydrocarbon organic polymer (structural component) such as an olefin polymer, a thermoplastic elastomer, or a hydrocarbon rubber. As the heat storage material 4a, a composition composed of a thermoplastic elastomer (structural component) and a paraffin group (heat storage component) containing at least one selected from the group consisting of paraffins, waxes, fatty acids such as stearic acid, and alcohols such as polyethylene glycol may be used. The thermoplastic elastomer used in this composition has rubber elasticity at or below the maximum crystal transition temperature Tmax of the paraffin.

The heat storage material 4a may be, for example, a material that stores heat by its phase change from the solid state to the liquid state. Such a material is, for example, paraffin, water (ice), or a hydrate such as sodium acetate trihydrate.

The envelope 4b is made of, for example, an aluminum-laminated film. The aluminum-laminated film is a film composed of an aluminum foil and resin films laminated on both sides of the aluminum foil. The aluminum-laminated film has a multilayer structure consisting of, for example, layers of polyethylene terephthalate, polyethylene, aluminum foil, and polypropylene. The innermost layer (polypropylene) of the aluminum-laminated film envelope has thermal adhesiveness (heat sealing properties). The film constituting the envelope 4b is not limited to the aluminum-laminated film. A known film for packaging such as a polyolefin film, a polyester film, a nylon film, or an ethylene-vinyl alcohol copolymer film may be used.

The heat storage body 4 can be produced by vacuum-packaging the plate-like heat storage material 4a in the envelope 4b. Specifically, the heat storage body 4 can be produced in the following manner. The heat storage material 4a is put into the bag-like envelope 4b made of the above-described film and having the sealing portion 4c at one end and an opening at the other end. Next, portions of the film forming the opening of the envelope 4b are thermally bonded together, with a gap left therebetween for evacuation. Next, the pressure in the interior of the envelope 4b is reduced by evacuation to remove gasses, water, etc. from the envelope 4b. Next, portions of the film of the envelope 4b corresponding to the gap for evacuation are thermally bonded together to close the gap. Thus, the sealing portion 4c is formed at the other end of the envelope 4b. The heat storage body 4 can be produced in this manner. The end surfaces of the plate-like envelope 4b are formed of a pair of sealing portions 4c and a pair of bent portions 4d, each of which is formed by simply bending a portion of the above-described film adjacent to the sealing portion 4c.

Figure 3:
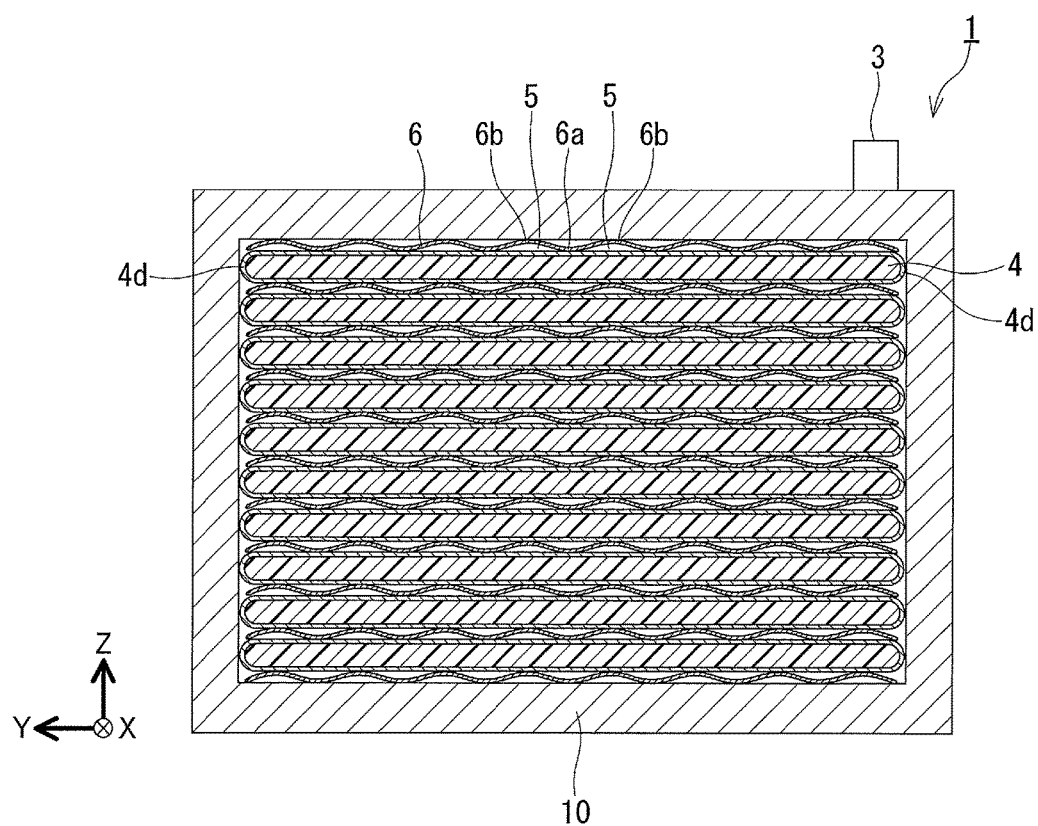
FIG. 3 is a cross-sectional view of the heat storage device shown in FIG. 1, in which a heat storage material is in the solid state, taken along the line B-B.
Figure 4:
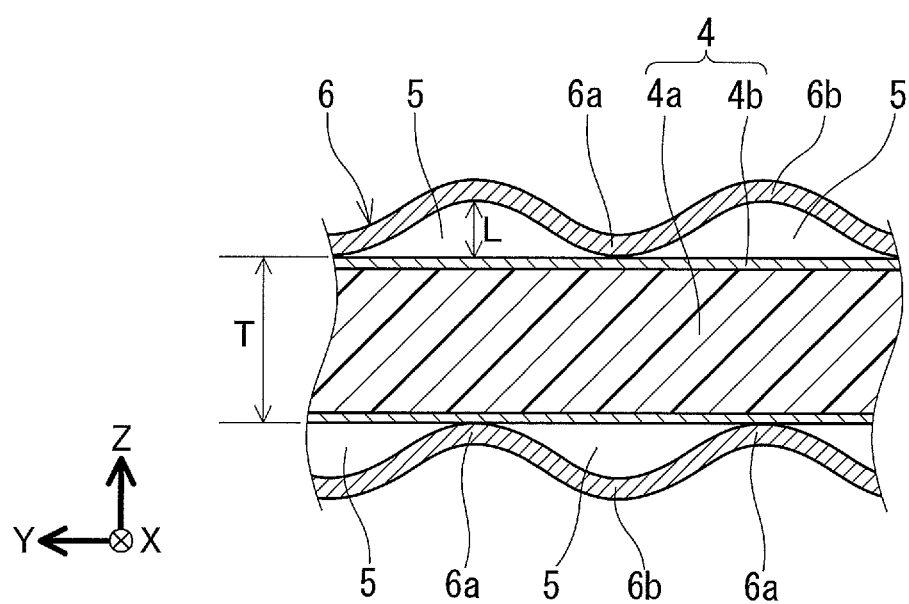
FIG. 4 is an enlarged partial view of FIG. 3.

As shown in FIG. 2 and FIG. 3, the spacer 6 is a plate-like member. The spacer 6 is made of, for example, a metal or a resin having corrosion resistance to the heat medium. The spacer 6 is placed on the heat storage body 4 in the heat storage container 10. Specifically, one spacer 6 is disposed on one surface (first principal surface) of a specific heat storage body 4 and another spacer 6 is disposed on the other surface (second principal surface) of the specific heat storage body 4. As shown in FIG. 4, the spacer 6 has a plurality of contact portions 6a that are in contact with the heat storage body 4 and a plurality of non-contact portions 6b that are spaced from the heat storage body 4. The contact portions 6a and the non-contact portions 6b are alternately formed in a specific direction (Y-axis direction). Each of the contact portions 6a extends straight in a direction (X-axis direction) intersecting the specific direction. Each of the non-contact portions 6b also extends straight in the direction (X-axis direction) intersecting the specific direction.

Attention is focused on the spacer 6 disposed between a pair of adjacent heat storage bodies 4. In this case, the contact portion 6a for one of these heat storage bodies 4 serves as a portion of the non-contact portion 6b for the other heat storage body 4, and a portion of the non-contact portion 6b for the one heat storage body 4 serves as the contact portion 6a for the other heat storage body 4. The spacer 6 has the almost the same length and almost the same width as the heat storage body 4. The contact portions 6a and the non-contact portions 6b are formed all over one surface (first principal surface) or the other surface (second principal surface) of the spacer 6. The plurality of contact portions 6a extending straight in the direction (X-axis direction) intersecting the specific direction stabilize the shape of the heat storage body 4.

Furthermore, the contact portions 6a have a curved shape. Therefore, stress concentration on the surface of the envelope 4b that is in contact with the contact portions 6a can be reduced. In addition, a load applied to the heat storage body 4 from the spacer 6 can be distributed. Since the heat storage body 4 is deformed to conform to the shape of the contact portions 6a, the shape of the heat storage body 4 is maintained even if the cycle of heat storage and heat release is repeated.

As shown in FIG. 3, the plurality of non-contact portions 6b of the spacer 6 form a plurality of flow paths 5 for the heat medium extending in the direction (X-axis direction) intersecting the specific direction between the surface of the heat storage body 4 and the spacer 6. That is, the heat storage device 1 includes the plurality of flow paths 5 for leading the heat medium from the inlet 2 to the outlet 3. The flow paths 5 are formed by the surface of the heat storage body 4 and the plurality of non-contact portions 6b and extend in the direction (X-axis direction) intersecting the specific direction. In each of the flow paths 5, the heat medium and the heat storage body 4 are in direct contact with each other. That is, the heat medium exchanges heat with the heat storage material 4a only through the envelope 4b of the heat storage body 4. Therefore, no thermal contact resistance occurs between the heat storage body 4 and the heat medium, the heat transfer characteristics between them are good.

As shown in FIG. 3, the spacer 6 is a member having a corrugated structure. Specifically, the spacer 6 has a corrugated structure in which protrusions on one surface of the spacer 6 form recesses on the other surface thereof. With such a configuration, the contact portions 6a and the non-contact portions 6b can be easily formed on both surfaces of the spacer 6. When the heat storage bodies 4 are disposed on both surfaces of the spacer 6, the contact portions 6a on one surface of the spacer 6 correspond to the non-contact portions 6b on the other surface thereof. This means that the contact portions 6a on one surface of the spacer 6 do not overlap the contact portions 6a on the other surface of the spacer 6 in the thickness direction thereof. Therefore, the thickness of the spacer 6 can be reduced. In the present embodiment, as shown in FIG. 3, the spacers 6 are disposed on both surfaces of each heat storage body 4 so that the plurality of flow paths 5 are formed in a staggered (zigzag) manner on both sides of the heat storage body 4 in a cross section of the heat storage device 1 perpendicular to the direction (X-axis direction) in which the heat medium flows in the flow paths 5. In other words, the distance between the pair of adjacent spacers 6 is constant. With such a configuration, the heat storage body 4 can be heated or cooled uniformly through both surfaces thereof.

In the present embodiment, the Z-axis direction is the vertical direction. As shown in FIG. 3, in the heat storage container 10, the plurality of heat storage bodies 4 and the plurality of spacers 6 are alternately arranged in the vertical direction. In this case, it is desirable that the specific gravity of the heat storage body 4 be less than that of the heat medium. With such a configuration, when the heat storage container 10 is filled with the heat medium, the buoyancy acting on the heat medium 4 is greater than the gravity acting on the heat medium 4. Therefore, it is possible to prevent the heat storage body 4 located near the bottom of the heat storage container 10 from being subjected to a heavy load. As a result, it is possible to prevent the heat storage body 4 located near the bottom of the heat storage container 10 from being significantly deformed, for example, when the heat storage material 4a is in the gel state or the liquid state. The specific gravity of the heat medium is, for example, 0.99 to 1.07, and the specific gravity of the heat storage body 4 is, for example, 0.95 to 0.97. It should be noted that when the heat storage container 10 is filled with the heat medium, the contact portions 6a of the spacer 6 need to be in contact with the heat storage body 4. Therefore, the specific gravity of the spacer 6 is greater than that of the heat medium.

As shown in FIG. 2, the heat storage body 4 is disposed in the heat storage container 10 in such a manner that the sealing portion 4c of the envelope 4b is located at the upstream end of the envelope 4b in the flow direction of the heat medium (on the side of the negative X-axis direction). As shown in FIG. 2, the upstream-side cover 7 is located upstream of this sealing portion 4c in the flow of the heat medium (on the side of the negative X-axis direction) and covers the sealing portion 4c. With such a configuration, it is possible to prevent the flow of the heat medium from being affected by the flexure of the sealing portion 4c. That is, it is possible to prevent the flexure of the sealing portion 4c from causing an imbalance between the flow rate of the heat medium flowing on the side of one surface (first principal surface) of the heat storage body 4 and the flow rate of the heat medium flowing on the side of the other surface (second principal surface) of the heat storage body 4.

Figure 8:
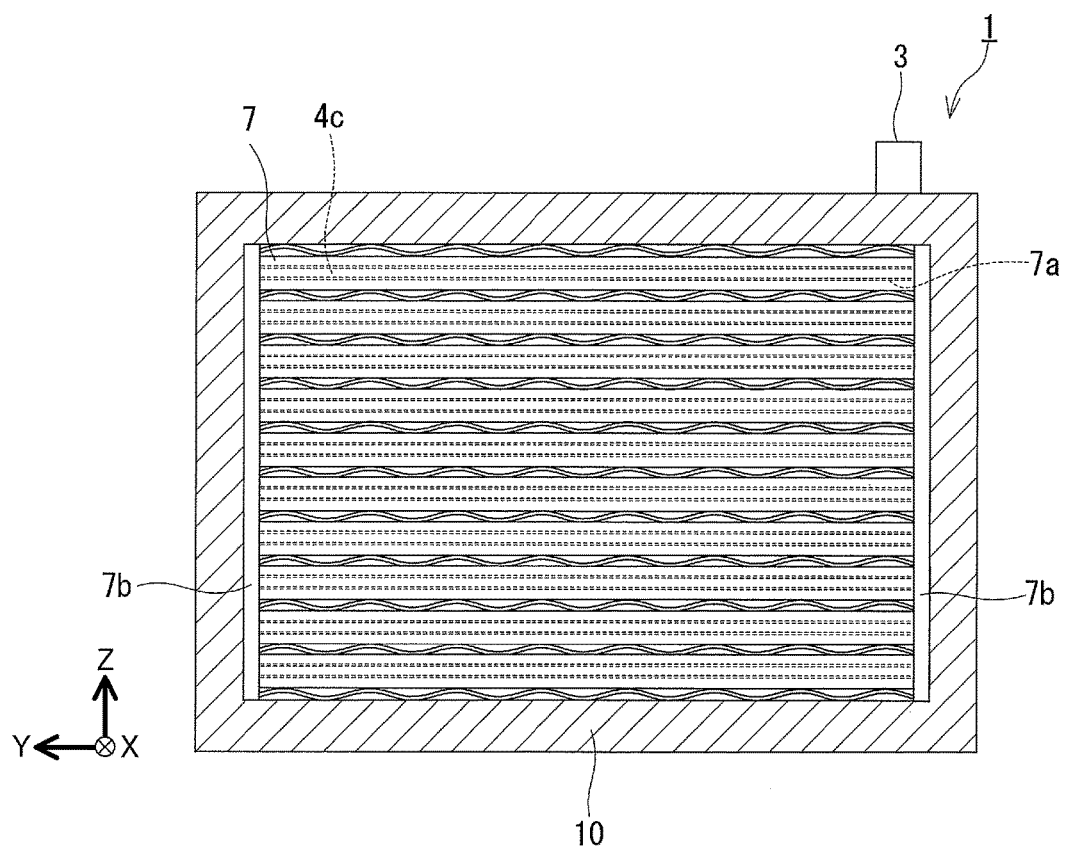
FIG. 8 is a cross-sectional view of the heat storage device shown in FIG. 2, taken along the line C-C.

As shown in FIG. 8, the upstream-side cover 7 has a groove 7a. The end portion of the sealing portion 4c is held by the groove 7a. The groove 7a extends straight in the width direction (Y-axis direction) of the heat storage device 1. Therefore, the groove 7a can correct the flexure of the sealing portion 4c inserted into the groove 7a to flatten it. The plurality of upstream-side covers 7 are arranged in the direction (Z-axis direction) in which the heat storage bodies 4 and the spacers 6 are arranged so that the upstream-side covers 7 correspond respectively to the sealing portions 4c of the heat storage bodies 4. The upstream-side covers 7 are coupled together by a pair of coupling members 7b at both ends of each cover 7 in the width direction (Y-axis direction) thereof. Gaps are formed between the adjacent upstream-side covers 7. Through these gaps, the heat medium flows into the space in which the heat storage bodies 4 are arranged.

As shown in FIG. 2, in the present embodiment, the other sealing portion 4c of the envelope 4b is located at the downstream end of the envelope 4b in the flow of the heat medium (on the side of the positive X-axis direction). The downstream-side cover 8 is located downstream of this sealing portion 4c in the flow of the heat medium (on the side of the negative X-axis direction) and covers the sealing portion 4c. The downstream-side cover 8 has the same configuration as the upstream-side cover 7 except that the downstream-side cover 8 faces in the opposite direction to the direction in which the upstream-side cover 7 faces.

As shown in FIG. 9, a number of through holes 11a are formed in the upstream-side flow regulation member 11. The total cross-sectional area of the through holes 11a is, for example, equal to or less than one half of the cross-sectional area of the flow path (YZ cross-sectional area) of the upstream-side flow regulation space 21. With such a configuration, it is possible to cause a predetermined pressure loss to occur in the flow of the heat medium. As shown in FIG. 2, the upstream-side flow regulation member 11 is provided at a position facing the upstream-side covers 7. As shown in FIG. 9, a set of through holes 11a are aligned along a straight line parallel to a plane perpendicular to the direction (Z-axis direction) in which the heat storage bodies 4 and the spacers 7 are arranged. This set of through-holes 11a are aligned along the center line of each upstream-side cover 7 in the direction (Z-axis direction) in which the upstream-side covers 7 are arranged. The upstream-side cover 7 has a symmetrical shape with respect to the center line thereof in the direction (Z-axis direction) in which the upstream-side covers 7 are arranged. Therefore, the incoming flows of the heat medium through the set of through holes 11a collide with the upstream-side cover 7 and then are distributed almost evenly toward the upper part and the lower part of the upstream-side cover 7. As a result, the imbalance between the flow rate of the heat medium flowing on the side of one surface of the heat storage body 4 and the flow rate of the heat medium flowing on the side of the other surface of the heat storage body 4 is prevented.

The downstream-side flow regulation member 12 is configured in the same manner as the upstream-side flow regulation member 11. The total cross-sectional areas of the through holes (not shown) in the downstream-side flow regulation member 12 is, for example, equal to or less than one half of the cross-sectional area of the flow path (YZ cross-sectional area) of the downstream-side flow regulation space 22. With such a configuration, it is possible to cause a predetermined pressure loss to occur in the flow of the heat medium.

<Operation of Heat Storage Device>

Next, the operation of the heat storage device 1 is described taking as an example a case where the heat storage material 4a has the property of storing heat by its phase change from the solid state to the gel state. First, the operation of the heat storage device 1 in the heat storage process is described. The heat medium whose temperature has been raised to a temperature at or above the melting point Tm of the heat storage component of the heat storage material 4a by a heat source (not shown) flows into the upstream-side flow regulation space 21 through the inlet 2. After flowing into the upstream-side flow regulation space 21, the heat medium flows into the flow paths 5 through the through holes 11a of the upstream-side flow regulation member 11 and through the gaps between the adjacent upstream-side covers 7. While flowing in the flow paths 5, the heat medium exchanges heat with the heat storage bodies 4 sequentially from the upstream side of the flow paths 5. After leaving the flow paths 5, the heat medium is discharged to the outside of the heat storage container 10 through the gaps between the adjacent downstream-side covers 8, the through holes (not shown) in the downstream-side flow regulation member, the downstream-side flow regulation space 22, and the outlet 3.

Figure 5:
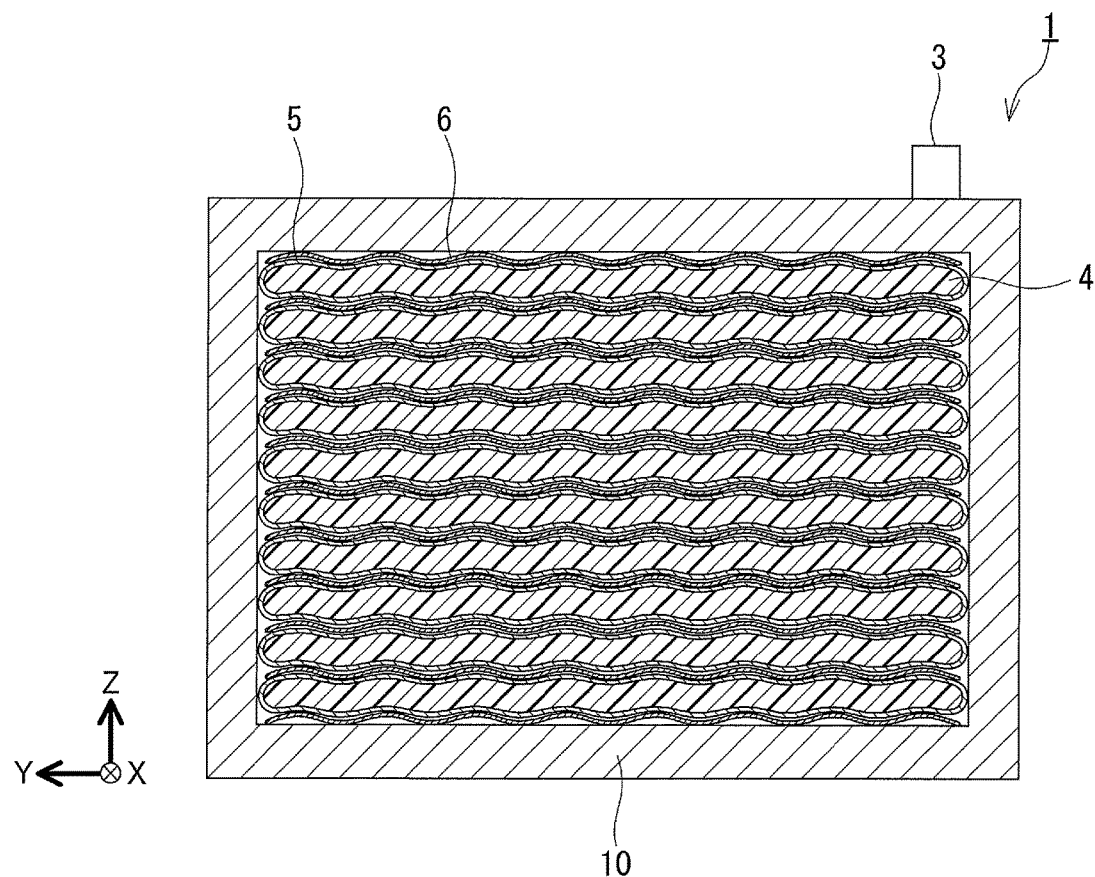
FIG. 5 is a cross-sectional view of the heat storage device shown in FIG. 1, in which the heat storage material is in the gel state, taken along the line B-B.
Figure 6:
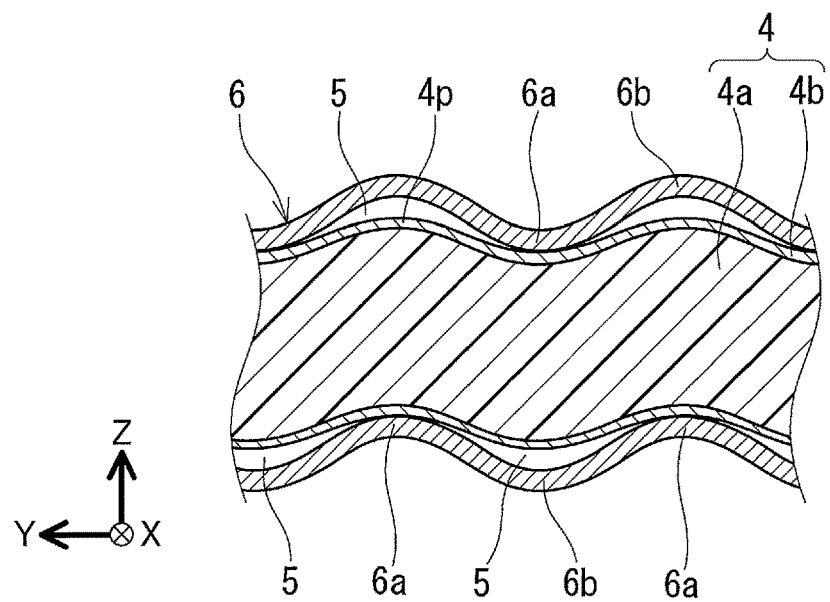
FIG. 6 is an enlarged partial view of FIG. 5.

In the early stage of the heat storage process, the heat storage material 4a is in the solid state. The temperature of the solid-state heat storage material 4a rises by heat exchange between the heat storage material 4a and the heat medium. Thereby, the heat of the heat medium is stored in the form of sensible heat in the solid-state heat storage material 4a. Furthermore, when the temperature of the heat storage material 4a rises to the melting point Tm of the heat storage component of the heat storage material 4a by the heat exchange between the heat storage material 4a and the heat medium, the phase of the heat storage material 4a changes from the solid state to the gel state. The temperature of the heat storage material 4a remains unchanged at Tm until the whole heat storage material 4a changes from the solid state to the gel state. Thereby, the heat of the heat medium can be stored in the form of latent heat in the heat storage material 4a. With this change of the state, the volume of the heat storage material 4a increases by 10 to 20%, for example. In this case, the heat storage body 4 is deformed as shown in FIG. 5 or FIG. 6. That is, the heat storage material 4a expands and thereby the heat storage body 4 is deformed in such a manner that the outer surface of the heat storage body 4 protrudes toward the non-contact portions 6b. Thus, when the heat storage material 4a is in the gel state, the protruding portions 4p protruding toward the non-contact portions 6b are formed in the heat storage body 4. Even when the heat storage material 4a is in the gel state, gaps serving as the flow paths 5 are formed between the protruding portions 4p and the non-contact portions 6b. Therefore, it is possible to prevent the flow paths 5 from being closed by the expansion of the heat storage material 4a. In addition, since the heat storage material 4a has the property of storing heat by its phase change from the solid state to the gel state, the shape of the heat storage body is relatively stable even if the heat storage material 4a changes its phase. Therefore, the flow paths 5 are less likely to be closed by the deformation of the heat storage body 4 associated with the phase change of the heat storage material 4a.

In order to prevent the flow paths 5 from being closed by the expansion of the heat storage material 4a as described above, it is desirable that a given relationship hold between the dimensions of the spacer 6 and the dimensions of the heat storage body 4. As shown in FIG. 4, when the distance in the thickness direction of the spacer 6 between the point of contact of the contact portion with the heat storage body 4 and the point of the non-contact portion 6b farthest from the heat storage body 4 is defined as L and the thickness of the heat storage body 4 is defined as T, L/T is desirably 0.2 or more. With this configuration, it is possible to limit the increase in the volume of the heat storage body 4 caused by the expansion of the heat storage material 4a, within the spaces (flow paths 5) between the spacer 6 and the outer surface of the heat storage body. It is also possible to prevent the flow paths 5 from being closed by the expansion of the heat storage material 4a. From the viewpoint of effective arrangement of the heat storage bodies 4 in the heat storage container 10, L/T may be 0.4 or less.

When the whole heat storage material 4a changes into the gel state, the temperature of the heat storage material 4a rises again. Thereby, the heat of the heat medium is stored in the form of sensible heat in the gel-state heat storage material 4a.

Next, the operation of the heat storage device 1 in the heat release process is described. The low-temperature heat medium whose temperature has been lowered to a temperature lower than the freezing point Tf of the heat storage component of the heat storage material 4a by heat exchange with air or the like, for example, in the heat releasing portion (not shown) flows into the upstream-side flow regulation space 21 through the inlet 2. The low-temperature heat medium flows in the heat storage container 10 and then is discharged to the outside of the heat storage container 10 through the outlet 3 in the same manner as in the heat storage process. In this case, the heat storage material 4a is cooled by heat exchange between the heat medium and the heat storage body 4 sequentially from the upstream side of the flow paths 5.

The temperature of the heat storage material 4a in the gel state drops by heat exchange between the heat storage material 4a and the heat medium. The heat medium is warmed by the sensible heat associated with a decrease in the temperature of this gel-state heat storage material 4a. Furthermore, when the temperature of the heat storage material 4a drops to Tf by the heat exchange between the heat storage material 4a and the heat medium, the heat storage material 4a starts to change from the gel state to the solid state. The temperature of the heat storage material 4a remains unchanged at Tf until the whole heat storage material 4a changes from the gel state to the solid state. The heat medium is warmed by the latent heat associated with this state change. When the whole heat storage material 4a changes into the gel state, the temperature of the heat storage material 4a drops again. The heat medium is warmed also by the sensible heat associated with the decrease in the temperature of this solid-state heat storage material 4a. This warmed heat medium is discharged through the outlet 3 and then supplied to the heat releasing portion (not shown). The heat medium exchanges heat with air or the like, for example, in the heat releasing portion. Thus, the heat stored in the form of latent heat and sensible heat in the heat storage member 4a is supplied to the outside of the heat storage device 1.

Figure 7:
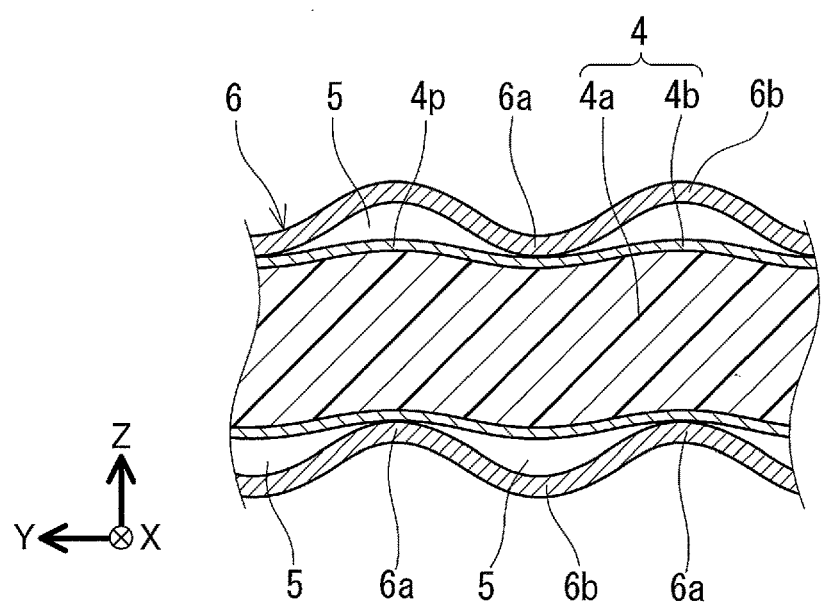
FIG. 7 is a cross-sectional view of a heat storage body, in which the heat storage material is in the solid state.

When the heat storage material 4a changes from the gel state to the solid state, the volume of the heat storage material 4a decreases by about 10 to 20%. Therefore, the heat storage body 4 changes its shape from that shown in FIG. 6 in the heat storage process to that as shown in FIG. 7. That is, the height of the protruding portions 4p of the heat storage body 4 is reduced by contraction of the heat storage material 4a. Therefore, as shown in FIG. 7, the surface of the solid-state heat storage body 4 has a more gently undulating shape than the surface of the gel-state heat storage body 4.

In the case where the above-described heat storage process and the heat release process are repeated, the shape of the heat storage body 4 is alternately changed between the shape shown in FIG. 6 and the shape shown in FIG. 7. Since the change in the shape of the heat storage body 4 can be appropriately controlled by the spacers 6, the shape of the heat storage body 4 is stabilized. Therefore, the heat storage device 1 has good reliability in the heat storage/heat release cycles. In the absence of the spacers 6, when the heat storage material 4a changes from the gel state to the solid state, the contracting portions of the heat storage material 4a cannot be controlled as described above, and therefore, the shape of the heat storage body 4 becomes unstable. As a result, the heat storage device becomes less reliable.

The heat medium is not particularly limited as long as it has fluidity. The heat medium is, for example, an aqueous solution of ethylene glycol or an aqueous solution of propylene glycol. When the heat medium is an aqueous solution of ethylene glycol or an aqueous solution of propylene glycol, the heat medium is less likely to freeze below the ice point. Since the heat storage material 4a is not in direct contact with the heat medium, it need not be insoluble or poorly soluble in the heat medium. However, in order to prevent elution of the heat storage material 4a into the flow paths 5 in case of damage of the envelope 4b, it is desirable that the heat storage material 4a be insoluble or poorly soluble in the heat medium. Whether or not the heat storage material 4a is poorly soluble in an aqueous solution of ethylene glycol can be determined by, for example, the solubility evaluation below.

<Solubility Evaluation of Heat Storage Material>

5.0 g of the heat storage material 4a is added to 70 mL of ethylene glycol whose temperature has been raised to or above the melting point of the heat storage component, and the resulting ethylene glycol solution is refluxed for 3 hours for extraction. Then, the heat storage material 4a dissolved in ethylene glycol is extracted with toluene by solvent extraction, and toluene is evaporated to quantify the amount of the extracted heat storage material 4a and to analyze the composition of the extract by FT-IR (Fourier transform infrared spectroscopy). When the elution rate of the heat storage component obtained as a result of the composition analysis is 0.02 $g/m^2 \cdot h$ or less, it is determined that the heat storage material 4a is poorly soluble in an aqueous solution of ethylene glycol. As used herein, the elution rate can be defined as the amount of the heat storage component eluted from the heat storage material 4a per unit surface area per hour.

As examples of the heat storage material 4a, heat storage materials each composed of a material containing a paraffin compound and a hydrogenated diene copolymer that fixes the paraffin compound so that the heat storage material 4a changes into the gel state at or above the melting point of the paraffin compound were prepared and the solubility evaluation of these materials was performed as described above. In the case of a heat storage material containing a standard amount of hydrogenated diene copolymer, the elution rate of paraffin was 0.3 $g/m^2 \cdot h$. On the other hand, in the case of a heat storage material containing twice the standard amount of hydrogenated diene copolymer, the elution rate of paraffin was 0.02 $g/m^2 \cdot h$. Therefore, the latter heat storage material is poorly soluble in an aqueous solution of ethylene glycol.

Whether or not the heat storage material 4a is poorly soluble in an aqueous solution of propylene glycol can also be evaluated in the same manner by using propylene glycol instead of ethylene glycol in the above-described solubility evaluation.

(Modifications)

The above-described embodiment can be modified in various ways. The upstream-side covers 7, the downstream-side covers 8, the upstream-side flow regulation member 11 or the downstream-side flow regulation member 12 can be omitted, as needed. The number of the heat storage bodies 4 disposed in the heat storage container 10 is not particularly limited, and only one heat storage body 4 may be disposed.

The direction in which the heat storage bodies 4 and the spacers 6 are arranged may be arbitrarily determined. For example, the plurality of heat storage bodies 4 and the plurality of spacers 6 may be alternately arranged in the horizontal direction in the heat storage container 10. That is, the heat storage device 1 may be configured such that the XZ plane in the accompanying drawings is the horizontal plane. With such a configuration, it is possible to prevent a specific heat storage body of the plurality of heat storage bodies 4 from being subjected to a heavy load.

The heat storage body 4 may be disposed in the heat storage container 10 in such a manner that the sealing portion 4c of the envelope 4b extends in the flow direction of the heat medium. In this case, the heat storage body 4 is disposed in the heat storage container 10 in such a manner that the bent portion 4d of the envelope 4b is located at the upstream end in the flow of the heat medium. Thereby, it is possible to prevent the flexure of the sealing portion 4c from causing an imbalance between the flow rate of the heat medium flowing on the side of one surface of the heat storage body 4 and the flow rate of the heat medium flowing on the side of the other surface of the heat storage body 4. The upstream-side covers 7 or the downstream-side covers 8 may be omitted in some cases.

Figure 10A:
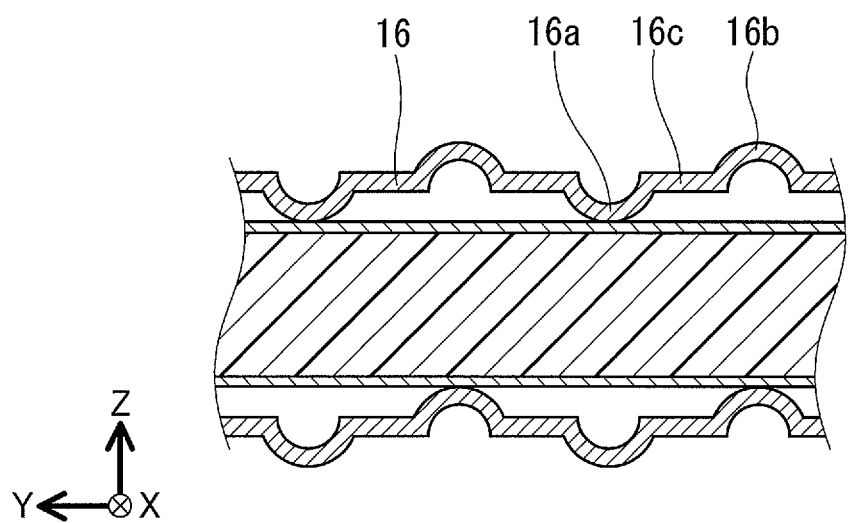
FIG. 10A is a cross-sectional view of a spacer according to a modification.
Figure 10B:
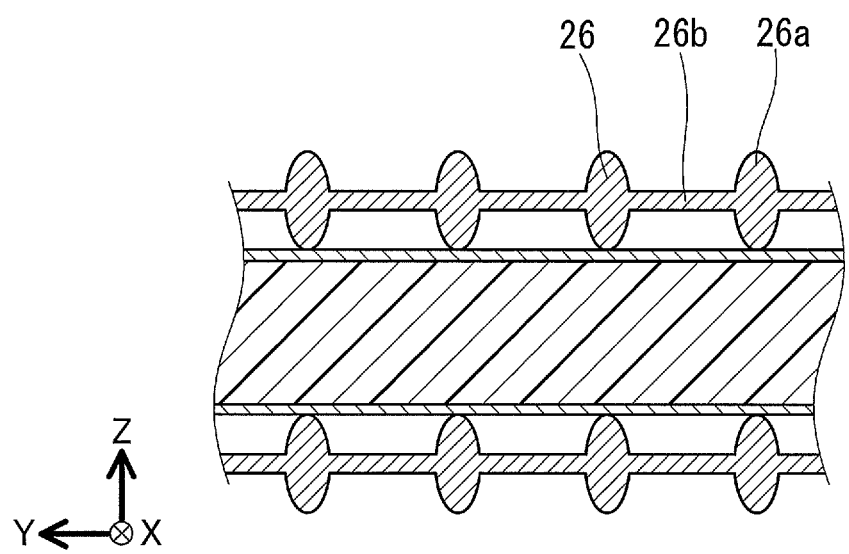
FIG. 10B is a cross-sectional view of a spacer according to another modification.
Figure 10C:
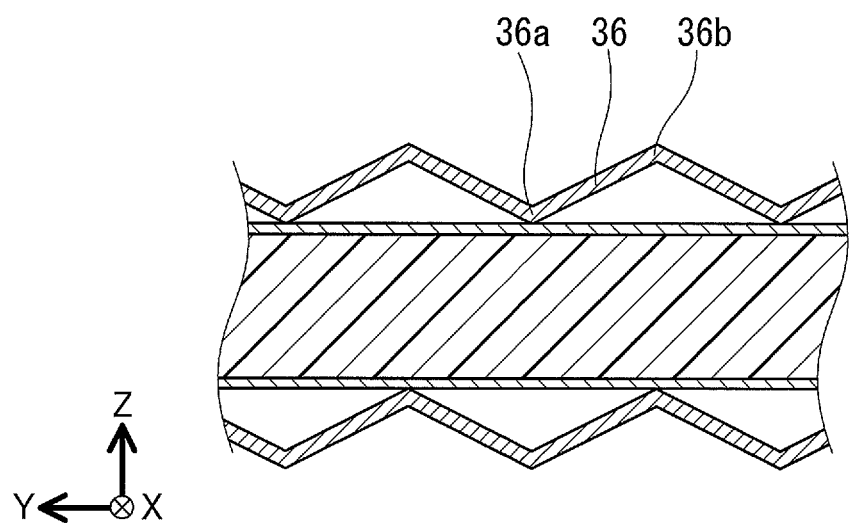
FIG. 10C is a cross-sectional view of a spacer according to still another modification.
Figure 11:
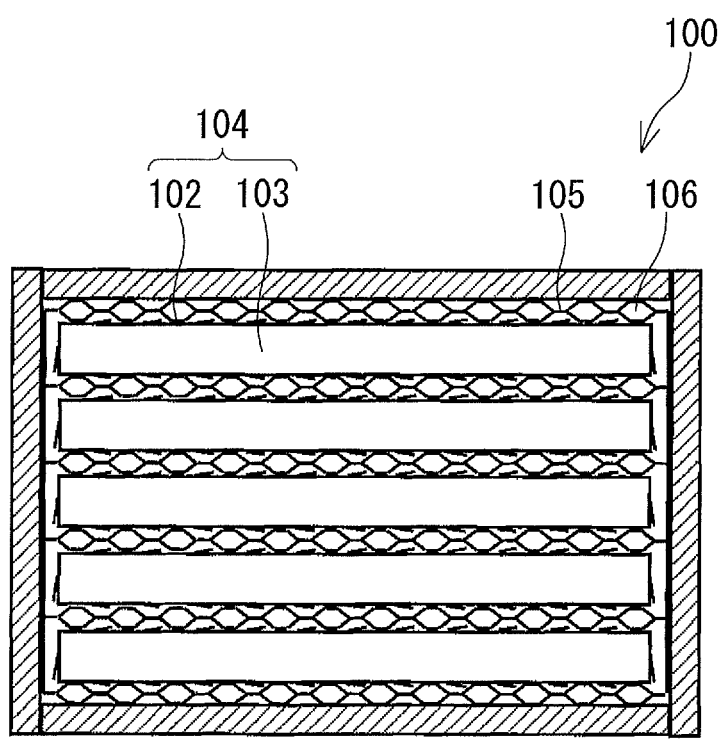
FIG. 11 is a cross-sectional view of a conventional heat storage device.

The spacer 6 may have the shape of a spacer 16 according to a modification shown in FIG. 10A, a spacer 26 according to another modification shown in FIG. 10B, or a spacer 36 according to another modification shown in FIG. 10C. The spacer 16 has a cross-sectional structure having arch-like protruding portions 16a (16b) that alternately protrude in opposite directions and straight portions 16c that connect the adjacent protruding portions 16a (16b) in a straight line. In this case, the protruding portions 16a (16b) serve as the contact portions on one surface of the spacer 16 and as the non-contact portions on the other surface thereof. This spacer can be produced by pressing a flat member.

As shown in FIG. 10B, the spacer 26 has a cross-sectional structure having protruding portions 26a that concurrently protrude in opposite directions and straight portions 26b that connect the adjacent protruding portions 26a in a straight line. In this case, the protruding portions 26a serve as the contact portions, and the straight portions 26b serve as the non-contact portions.

As shown in FIG. 10C, the spacer 36 is a member having a corrugated structure. The spacer 36 has a cross-sectional structure in which valley portions 36a and ridge portions 36b are alternately arranged. The valley portions 36a serve as the contact portions on one surface of the spacer 36 and as the non-contact portions on the other surface thereof. The ridge portions 36a serve as the non-contact portions on one surface of the spacer 36 and as the contact portions on the other surface thereof.

INDUSTRIAL APPLICABILITY

The heat storage device according to the present disclosure has good heat transfer characteristics between the heat storage material and the heat medium. The heat storage device has good reliability in heat storage/heat release cycles. For these reasons, the heat storage device of the present disclosure can be used for domestic, commercial, and automotive applications.

The invention claimed is:

1. A heat storage device comprising:
   a heat storage container having an inlet and an outlet for a heat medium;

a plurality of plate-like heat storage bodies stacked in the heat storage container, each of the plurality of heat storage bodies comprising a heat storage material and an envelope containing the heat storage material;

a plurality of plate-like spacers, each placed between respective pairs of the heat storage bodies in the heat storage container, each of the plurality of plate-like spacers having a plurality of contact portions that are in contact with one of the respective pair of the heat storage bodies and a plurality of non-contact portions that are spaced from the one of the respective pair of the heat storage bodies, the contact portions for the one of the respective pair of the heat storage bodies defining non-contact portions for the other of the respective pair of the heat storage bodies and the non-contact portions for the one of the respective pair of the heat storage bodies defining contact portions for the other of the respective pair of the heat storage bodies, and the contact portions and the non-contact portions being alternately formed in a specific direction; and a plurality of flow paths for leading the heat medium from the inlet to the outlet, the flow paths being formed by a surface of the heat storage body and the respective non-contact portions and extending in a direction intersecting the specific direction, wherein the plurality of plate-like spacers are disposed in the heat storage container without direct connection to one another, and each of the heat storage bodies is deformable relative to the non-contact portion of an adjacent one of the plurality of plate-like spacers in the heat storage container, wherein the heat storage material changes from a first state to a second state upon heat exchange with the heat medium, the plurality of heat storage bodies expand or contract in response to the heat storage material changes from the first state to the second state, and a volume of the heat storage material increases from 10% to 20% upon changing to the second state, and when a distance in a thickness direction of the plurality of plate-like spacers between a point of contact of the contact portion with the at least one heat storage body and a point of the non-contact portion farthest from the at least one heat storage body is defined as L and a thickness of the at least one heat storage body is defined as T, in the first state, L/T is between 0.2 and 0.4.

2. The heat storage device according to claim 1, wherein the contact portions each have a curved shape.

3. The heat storage device according to claim 1, wherein each of the plurality of plate-like spacers has a corrugated structure.

4. The heat storage device according to claim 1, wherein each of the heat storage bodies is disposed in the heat storage container in such a manner that a sealing portion of the envelope is located at an upstream end of the envelope in a direction of flow of the heat medium, and the heat storage device further comprises a cover located upstream of the sealing portion in the flow of the heat medium, the cover covering the sealing portion.

5. The heat storage device according to claim 1, wherein the plurality of heat storage bodies and the plurality of plate-like spacers are alternately arranged in a vertical direction in the heat storage container, and a specific gravity of the heat storage body is less than that of the heat medium.

6. The heat storage device according to claim 1, wherein the plurality of heat storage bodies and the plurality of plate-like spacers are alternately arranged in a horizontal direction in the heat storage container.

7. The heat storage device according to claim 1, wherein the heat storage material stores heat by phase change from the first state that is a solid state to the second state that is a gel state.

8. The heat storage device according to claim 7, wherein each of the heat storage bodies has a protruding portion that protrudes toward the respective non-contact portion when the heat storage material is in the gel state, and a gap serving as the flow path is formed between the protruding portion and the non-contact portion.

9. The heat storage device according to claim 7, wherein the heat storage material is made of a material containing a paraffin compound and a hydrogenated diene copolymer that fixes the paraffin compound so that the heat storage material changes into the gel state at or above a melting point of the paraffin compound.

10. The heat storage device according to claim 1, wherein the heat medium is an aqueous solution of ethylene glycol or an aqueous solution of propylene glycol.

11. The heat storage device according to claim 1, wherein a temperature of the heat medium in the second state is higher than a temperature of the heat medium in the first state.

12. The heat storage device according to claim 4, wherein the cover has a groove that receives the sealing portion.

13. The heat storage device according to claim 1, wherein L and T are inversely related.

14. The heat storage device according to claim 1, wherein the plurality of plate-like spacers are without direct connection to each other at an end or along a side.

* * * * *